US012335075B2

(12) United States Patent
Cao et al.

(10) Patent No.: US 12,335,075 B2
(45) Date of Patent: Jun. 17, 2025

(54) METHOD AND APPARATUS FOR COMMUNICATIONS

(71) Applicant: NXP USA, Inc., Austin, TX (US)

(72) Inventors: Rui Cao, Sunnyvale, CA (US); Liwen Chu, San Ramon, CA (US); Sudhir Srinivasa, Los Gatos, CA (US); Hongyuan Zhang, Fremont, CA (US); Yan Zhang, Palo Alto, CA (US); Xiayu Zheng, San Jose, CA (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/182,075

(22) Filed: Feb. 22, 2021

(65) Prior Publication Data

US 2021/0266386 A1    Aug. 26, 2021

Related U.S. Application Data

(60) Provisional application No. 63/011,557, filed on Apr. 17, 2020, provisional application No. 63/005,526, (Continued)

(51) Int. Cl.
*H04L 27/26* (2006.01)
*H04L 69/08* (2022.01)
(Continued)

(52) U.S. Cl.
CPC ..........  *H04L 27/2602* (2013.01); *H04L 69/08* (2013.01); *H04W 72/04* (2013.01);
(Continued)

(58) Field of Classification Search
CPC . H04L 69/08; H04L 27/2602; H04L 2212/00; H04L 5/0044; H04L 5/001;
(Continued)

(56) References Cited

U.S. PATENT DOCUMENTS 10,079,628 B2    9/2018  Sun et al.
10,264,580 B2    4/2019  Wu et al.
(Continued)

FOREIGN PATENT DOCUMENTS

DE    102016103103 A1    9/2016

OTHER PUBLICATIONS

IEEE, "IEEE P802.11ax™/D6.0", Draft Standard for Information technology—Telecommunications and information exchange between systems Local and metropolitan area networks Specific requirements, Nov. 2019, 780 pgs.
(Continued)

*Primary Examiner* — Pao Sinkantarakorn

(57) ABSTRACT

Embodiments of a method and an apparatus for wireless communications are disclosed. In an embodiment, a method for wireless communications involves encoding bits in a first preamble portion of a packet that are defined on a per-channel basis and that are repeated across multiple frequency blocks of a bandwidth, encoding bits in a second preamble portion of the packet that are defined on the per-channel basis and that are repeated within at least one frequency block of the bandwidth, encoding bits in a third preamble portion of the packet that are defined on a two-channel basis and that are repeated within at least one frequency block of the bandwidth, padding the third preamble portion of the packet to have a same length for each of the frequency blocks, and transmitting the packet.

17 Claims, 12 Drawing Sheets

Related U.S. Application Data filed on Apr. 6, 2020, provisional application No. 62/984,087, filed on Mar. 2, 2020, provisional application No. 62/980,745, filed on Feb. 24, 2020, provisional application No. 62/980,204, filed on Feb. 22, 2020.

(51) Int. Cl.
  *H04W 72/04* (2023.01)
  *H04W 80/04* (2009.01)
  *H04W 84/12* (2009.01)

(52) U.S. Cl.
  CPC ....... *H04L 2212/00* (2013.01); *H04W 80/045* (2013.01); *H04W 84/12* (2013.01)

(58) Field of Classification Search
  CPC .......................... H04L 5/0094; H04W 80/045; H04W 74/002; H04W 74/006; H04W 72/04
  See application file for complete search history.

(56) References Cited

U.S. PATENT DOCUMENTS

| | | | |
|---|---|---|---|
| 10,904,061 B2 | 1/2021 | Yang et al. | |
| 11,096,153 B2* | 8/2021 | Lim | H04L 5/0053 |
| 11,212,705 B2 | 12/2021 | Cao et al. | |
| 2016/0285526 A1 | 9/2016 | Hedayat | |
| 2019/0097850 A1 | 3/2019 | Kenney et al. | |
| 2020/0136884 A1 | 4/2020 | Park et al. | |
| 2020/0177425 A1 | 6/2020 | Chen et al. | |
| 2020/0382998 A1 | 12/2020 | Cao et al. | |
| 2021/0045151 A1* | 2/2021 | Chen | H04W 72/0446 |
| 2021/0127291 A1* | 4/2021 | Chen | H04L 5/0094 |
| 2021/0135792 A1 | 5/2021 | Cho et al. | |
| 2021/0250215 A1 | 8/2021 | Lim et al. | |
| 2021/0258115 A1 | 8/2021 | Liu et al. | |
| 2021/0266098 A1 | 8/2021 | Cao et al. | |
| 2021/0385118 A1 | 12/2021 | Umehara | |
| 2022/0070755 A1 | 3/2022 | Park et al. | |
| 2022/0095347 A1* | 3/2022 | Huang | H04W 72/1278 |
| 2022/0330087 A1 | 10/2022 | Lim et al. | |

OTHER PUBLICATIONS

Porat, Ron et al. "SIG-B Encoding Structure", doc. IEEE 802.11-15/0873, Jul. 13, 2015, 13 pgs.

Porat, Ron et al. "SIG-B Encoding Structure Part II", doc. IEEE 802.11-15/1059, Sep. 14, 2015, 15 pgs.

U.S. Appl. No. 17/182,091 NFOA mailed Mar. 30, 2022—22 pages.

IEEE, "IEEE P802.11ax™/D4.3", Draft Standard for Information technology—Telecommunications and information exchange between systems Local and metropolitan area networks Specific requirements, Aug. 2019, 782 pgs.

U.S. Appl. No. 17/182,091 FOA mailed Oct. 18, 2022—26 pages.

U.S. Appl. No. 17/182,091 Notice of Allowance mailed Feb. 2, 2023—14 pages.

* cited by examiner 700-1

| RU COMBINATIONS | ENTRIES | 8 RA BITS |
|---|---|---|
| 242 | 4 + 3 | 0xxxxxxx |
| 484 | 3 + 3 | 10xxxxxx |
| 996 | 2 + 3 | 110xxxxx |
| 996*2 | 1 + 3 | 1110xxxx |
| 996*3 | 1 + 3 | 1111xxxx |

FIG. 7A 700-2

| RU COMBINATIONS | ENTRIES | 9 RA BITS |
|---|---|---|
| 52 | 6 | 000xxxxxx |
| 106 | 5 + 1 | 001xxxxxx |
| 242 | 4 + 3 | 01xxxxxxx |
| 484 | 3 + 3 | 100xxxxxx |
| 996 | 2 + 3 | 1010xxxxx |
| 996*2 | 1 + 3 | 10110xxxx |
| 996*3 | 1 + 3 | 10111xxxx |

FIG. 7B 800-1

| ASSIGNED NSS | ENTRIES |
|---|---|
| 16ss | 1 |
| 12ss | 5 |
| 8ss | 9 |
| 4ss | 13 |
| 2ss | 15 |
| 1ss | 16 |

FIG. 8A 800-2

| ASSIGNED NSS | ENTRIES |
|---|---|
| 16ss | 1 |
| 14ss | 3 |
| 12ss | 5 |
| 10ss | 7 |
| 8ss | 9 |
| 6ss | 11 |
| 4ss | 13 |
| 2ss | 15 |
| 1ss | 16 |

FIG. 8B

METHOD AND APPARATUS FOR COMMUNICATIONS

CROSS-REFERENCE TO RELATED APPLICATIONS

This application is entitled to the benefit of U.S. Provisional Patent Application Ser. No. 62/980,204, filed on Feb. 22, 2020, and U.S. Provisional Patent Application Ser. No. 62/980,745, filed on Feb. 24, 2020, and U.S. Provisional Patent Application Ser. No. 62/984,087, filed on Mar. 2, 2020, and U.S. Provisional Patent Application Ser. No. 63/005,526, filed on Apr. 6, 2020, and U.S. Provisional Patent Application Ser. No. 63/011,557, filed on Apr. 17, 2020, each of which is incorporated by reference herein.

BACKGROUND

In wireless communications, devices, e.g., access point (AP) multi-link devices (MLDs) or non-AP MLDs, e.g., STA multi-link devices (STA MLDs), can transmit various types of information, such as bandwidth information, resource allocation (RA) information, and user specific information for communication between devices using different transmission techniques. As an example, a communications device in a multi-link Basic Service Set (BSS) may wirelessly transmit a Physical layer Protocol Data Unit (PPDU) to communicate information and update device parameters. However, as the protocols for transmitting information change, there is a need to efficiently account for multiple different transmission techniques.

SUMMARY

Embodiments of a method and an apparatus for wireless communications are disclosed. In an embodiment, a method for wireless communications involves encoding bits in a first preamble portion of a packet that are defined on a per-channel basis and that are repeated across multiple frequency blocks of a bandwidth, encoding bits in a second preamble portion of the packet that are defined on the per-channel basis and that are repeated within at least one frequency block of the bandwidth, encoding bits in a third preamble portion of the packet that are defined on a two-channel basis and that are repeated within at least one frequency block of the bandwidth, padding the third preamble portion of the packet to have a same length for each of the frequency blocks, and transmitting the packet.

In an embodiment, encoding bits in the second preamble portion of the packet that are defined on the per-channel basis are repeated within each frequency block of the bandwidth, and encoding bits in the third preamble portion of the packet that are defined on the two-channel basis are repeated within each frequency block of the bandwidth.

In an embodiment, the method further involves receiving the second preamble portion of the packet and the third preamble portion of the packet from multiple frequency blocks.

In an embodiment, encoding bits in the second preamble portion of the packet that are defined on the per-channel basis are repeated within each frequency block of the bandwidth, and encoding bits in the third preamble portion of the packet that are defined on the two-channel basis are repeated within one frequency block of the bandwidth.

In an embodiment, the third preamble portion of the packet in one frequency block includes resource allocation (RA) information from each frequency block.

In an embodiment, the third preamble portion of the packet indicates RA by cascading RA information from each frequency block.

In an embodiment, the third preamble portion of the packet indicates RA by cascading RA bits from each frequency block followed by cascading user information bits from each frequency block.

In an embodiment, the RA bits indicate RA of each frequency block.

In an embodiment, the RA bits are made up of a user specific information field.

In an embodiment, the user specific information field includes frequency RA bits and number of spatial stream (Nss) bits.

In an embodiment, the frequency RA bits indicate the RA of each frequency block and use at least one of 8 bits and 9 bits.

In an embodiment, the Nss bits use at least one of 6 bits, 7 bits, and 8 bits.

In an embodiment, the method further involves receiving the second preamble portion of the packet and the third preamble portion of the packet from one frequency block, wherein the second preamble portion of the packet and the third preamble portion of the packet include signaling information for the entire bandwidth.

In an embodiment, a wireless device that supports a maximum bandwidth of at least one of less than and equal to a frequency block size decodes the second preamble portion of the packet and the third preamble portion of the packet from one frequency block.

In an embodiment, a wireless device that supports a maximum bandwidth larger than the frequency block size decodes the second preamble portion of the packet and the third preamble portion of the packet from more than one frequency block.

In an embodiment, the frequency block size is at least one of 160 MHz and 80 MHz.

In an embodiment, the third preamble portion of the packet signals RA information for Orthogonal Frequency-Division Multiple Access (OFDMA) transmission.

In an embodiment, the third preamble portion of the packet in one frequency block signals RA information for the frequency blocks that are allocated to at least one wireless device parked on at least one frequency block.

An embodiment of a wireless device is also disclosed. The wireless device includes a processor configured to encode bits in a first preamble portion of a packet that are defined on a per-channel basis and that are repeated across multiple frequency blocks of a bandwidth, encode bits in a second preamble portion of the packet that are defined on the per-channel basis and that are repeated within at least one frequency block of the bandwidth, encode bits in a third preamble portion of the packet that are defined on a two-channel basis and that are repeated within at least one frequency block of the bandwidth, pad the third preamble portion of the packet to have a same length for each of the frequency blocks, and transmit the packet.

Another embodiment of a method for wireless communications is disclosed. The method involves encoding bits in a legacy field of a packet that are defined on a per-channel basis and that are repeated across multiple frequency blocks of a bandwidth, encoding bits in a U-SIG field of the packet that are defined on the per-channel basis and that are repeated within at least one frequency block, encoding bits in an EHT-SIG field of the packet that are defined on a two-channel basis and that are repeated within at least one frequency block, padding the EHT-SIG field of the packet to have a same length for each of the frequency blocks, and transmitting the packet.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 7A depicts an example of a resource allocation (RA) table that represents encoding in accordance with an embodiment of the invention.

FIG. 7B depicts another example of an RA table that represents encoding in accordance with an embodiment of the invention.

FIG. 8A depicts an example of a number of spatial streams (Nss) signaling table that represents encoding in accordance with an embodiment of the invention.

FIG. 8B depicts another example of an Nss signaling table that represents encoding in accordance with an embodiment of the invention.

Throughout the description, similar reference numbers may be used to identify similar elements.

DETAILED DESCRIPTION

Figure 1:
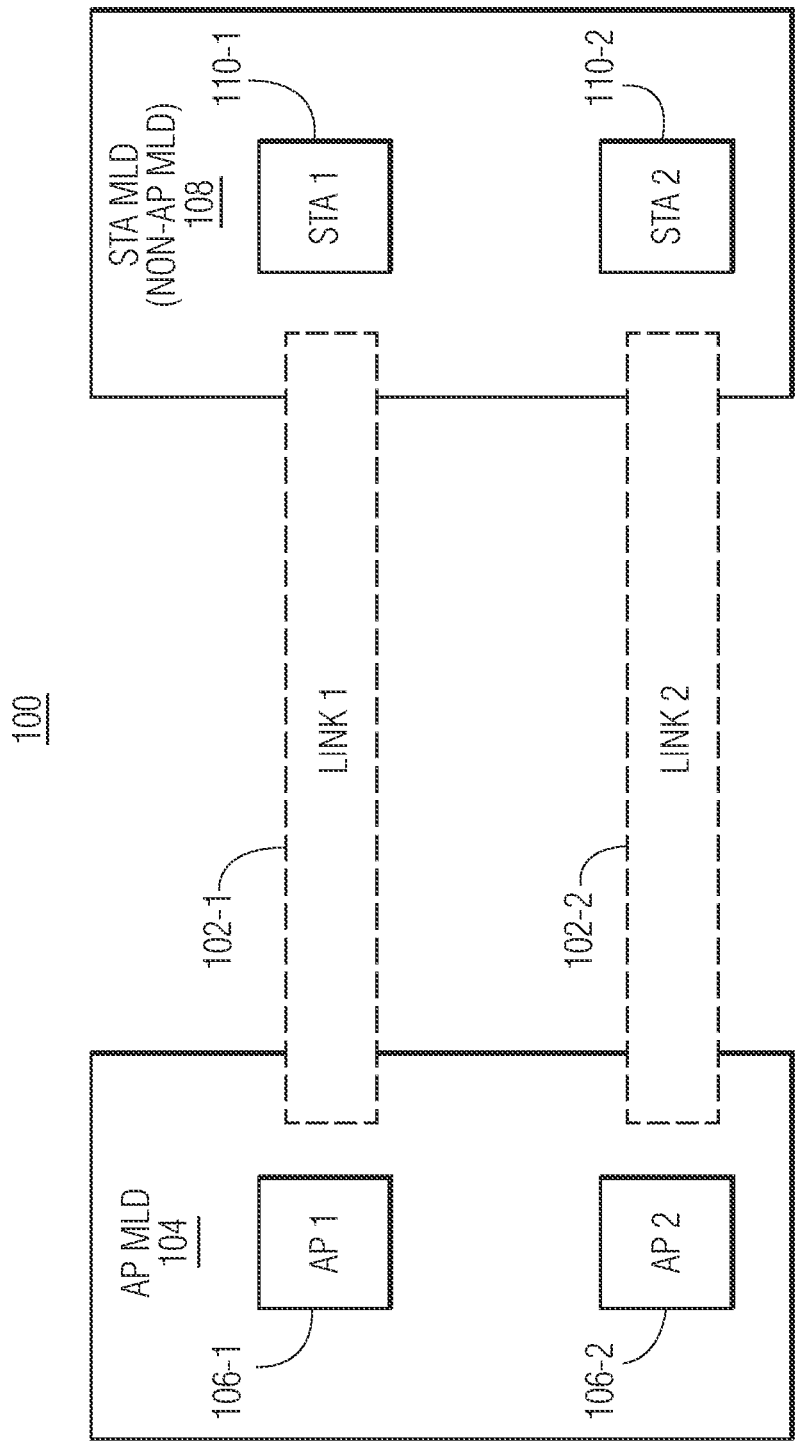
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a multi-link communications system, a multi-link device (MLD) such as an access point (AP) MLD of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and a next-generation communication protocol may be referred to herein as "non-legacy" features. In some embodiments, the next-generation communication protocol may be an IEEE communication protocol that succeeds the EHT communication protocol. In some embodiments of the multi-link communications system described herein, different associated STAs within range of an AP operating according to the EHT communication protocol are configured to operate according to at least one other communication protocol, which defines operation in the same frequency block (sometimes referred to herein as a "FB") as the AP, but are generally affiliated with lower data throughput protocols. Lower data throughput communication protocols (e.g., IEEE 802.11n, IEEE 802.11ac, or IEEE 802.11ax) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes multiple AP MLDs with one STA MLD, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 106-1 or 106-2 of the AP MLD 104 may operate in a different frequency block. For example, the AP 106-1 may operate in a 2.4 gigahertz (GHz) frequency block and the AP 106-2 may operate in a 5 GHz frequency block. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. Each of the non-AP STAs 110-1 and 110-2 of the STA MLD 108 may operate in a different frequency block. For example, the non-AP STA 110-1 may operate in the 2.4 GHz frequency block and the non-AP STA 110-2 may operate in the 5 GHz frequency block. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. Although the STA MLD 108 is shown in FIG. 1 as including two non-AP STAs, other embodiments of the STA MLD 108 may include more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via more than two communication links.

The EHT communication protocol (i.e., IEEE 802.11be standard) is a next version of the communications protocol that will succeed the IEEE High Efficiency (HE) 802.11ax standard. Additional future versions of the IEEE 802.11 communication protocol may succeed IEEE 802.11ax or IEEE 802.11be. It is desirable that future versions of the communication protocol provide backward compatibility and support interoperability with legacy versions of the IEEE 802.11 communication protocol. Thus, a preamble portion of a packet compliant with the IEEE 802.11be communication protocol may be distinguishable from a preamble portion of a packet that is compliant with a legacy communication protocol. As used herein, the term "packet" may refer to, for example, a Physical layer Protocol Data Unit (PPDU), or a PHY packet.

A packet, which includes a legacy preamble portion and a non-legacy preamble portion that may be transmitted by a communications device operating according to the IEEE 802.11be communication protocol to another communications device operating according to a legacy communication protocol or the IEEE 802.11be communication protocol, is described in further detail below with reference to FIG. 2.

Figure 2:
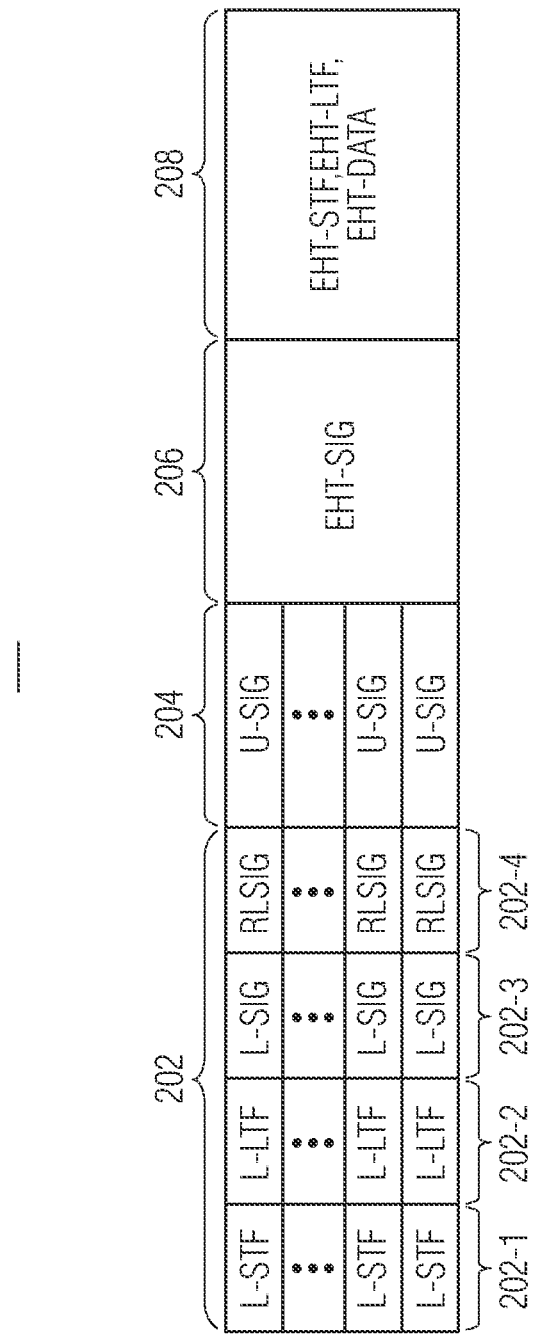
FIG. 2 depicts an example of a preamble of a packet.

FIG. 2 depicts an example of a preamble of a packet in accordance with an embodiment of the invention. In FIG. 2, the preamble of the packet may be used by a communications device operating according to the EHT communication protocol, such that the preamble of the packet signals information bits that enable coexistence for devices operating according to the EHT communication protocol, next-generation communication protocols, or legacy communication protocols. With reference to FIG. 2, one embodiment may involve a preamble 200 of a packet (entire packet not shown) including a legacy field, implemented as a first preamble portion 202, non-legacy fields, implemented as a second preamble portion 204 and a third preamble portion 206, and a wide-band (WB) preamble 208. In such an embodiment, the first preamble portion 202 includes a Legacy Short Training Field (L-STF) 202-1, a Legacy Long Training Field (L-LTF) 202-2, a Legacy Signal Field (L-SIG) 202-3, and a Repeated Legacy Signal Field (RL-SIG) 202-4, such that each field of the first preamble portion 200 may be repeated across subchannels of a bandwidth (e.g., as shown by the four rows within the first preamble portion 202). In such an embodiment, the second preamble portion 204 includes a Universal Signal Field (U-SIG) and the third preamble portion 206 includes an EHT Signal Field (EHT-SIG), such that the second preamble portion 204 may be repeated across subchannels of the bandwidth (e.g., as shown by the four rows within the second preamble portion 204) and used to signal information bits for the coexistence of EHT devices and next-generation devices, as well as common information bits for users (e.g., STAs), while the third preamble portion 206 may be used to signal other common information bits for users (e.g., STAs) and user specific information. In some embodiments, the second preamble portion 204 signals common information bits for all users (e.g., STA), while the third preamble portion 206 may be used to signal other common information bits for all users (e.g., STAs) and all user specific information. Furthermore, in such an embodiment, the WB preamble 208 of the preamble 200 may also include an EHT Short Training Field (EHT-STF), an EHT Long Training Field (EHT-LTF), and an EHT data portion (EHT-DATA).

With reference to FIG. 2, a communications device operating according to the EHT communication protocol may transmit a preamble 200 of a packet to an associated communications device operating according to the EHT communication protocol or the legacy communication protocol. For a packet with a bandwidth greater than 20 MHz, the first preamble portion 202 and the second preamble portion 204 may be defined on a per-channel basis and repeated across frequency blocks of an entire bandwidth, such that the entire bandwidth may be 320 MHz. In some embodiments, a frequency block may be 80 MHz or 160 MHz, and is made up of multiple channels, such that each channel within the frequency block may be 20 MHz or 40 MHz. In some embodiments, a primary channel may be defined for a listening STA to detect the preamble of the packet.

According to the EHT communication protocol and the next-generation communication protocols, the maximum supported bandwidth may continue to increase as more spectrum becomes available. For example, the EHT communication protocol is capable of supporting a maximum bandwidth of 320 MHz. Currently, the second preamble portion (U-SIG) of a packet formatted according to the EHT communication protocol is designed to support forward capability by including bandwidth information and other related information to signal how to decode the third preamble portion (EHT-SIG) of the packet. The second preamble portion (U-SIG) may also signal channel puncturing information (CPI), a common feature in devices operating according to the EHT communication protocol as the devices can operate in a 6 GHz band. Because the EHT communication protocol supports up to 320 MHz of bandwidth, a STA operating in an 80 MHz channel and a STA operating in a 160 MHz channel may exist, requiring the signaling of CPI in the second preamble portion (U-SIG) for STAs parked on a secondary 80 MHz/160 MHz channel using Overlapping Basic Service Set (OBSS) channel sharing. Examples of signaling CPI may involve the transmission of some signals associated with a given frame, and the omission of other signals ordinarily associated with the given frame. In addition, the third preamble portion (EHT-SIG) of the packet signals PPDU decoding information. According to the 802.11ax communication protocol, the third preamble portion (EHT-SIG) of the packet uses a "two subfield" structure to signal resource allocation (RA) information and user specific information. However, as the maximum bandwidth increases to 320 MHz according to the EHT communication protocol, information bits in each subfield double in comparison to the 802.11ax communication protocol. Consequently, transmitting bandwidth information, RA information, and user specific information between devices operating according to different communication protocols may increase overhead, decrease decoding reliability, and become more complicated relative to previous generations. Therefore, to efficiently manage signal overhead and transmit bandwidth information, RA information, and user specific information with puncturing considered, techniques in accordance with embodiments of the invention are described herein.

In accordance with an embodiment of the invention, a technique for wireless communications involves encoding bits in a first preamble portion of a packet that are defined on a per-channel basis and that are repeated across multiple frequency blocks of a bandwidth, encoding bits in a second preamble portion of the packet that are defined on a per-channel basis and that are repeated within at least one frequency block of the bandwidth, encoding bits in a third preamble portion of the packet that are defined on a two-channel basis and that are repeated within at least one frequency block of the bandwidth, padding the third preamble portion of the packet to have a same length for each of the frequency blocks, and transmitting the packet. In addition, the technique may involve encoding bits in a self-contained preamble portion of the packet which consolidates information and simplifies encoding, decoding, and transmitting processes. Because bits are encoded in the self-contained preamble portion of the packet, bandwidth information and RA information can be transmitted more effectively while supporting a legacy communication protocol, an EHT communication protocol, and a next-generation communication protocol.

A technique for wireless communications that involves encoding bits in a preamble of a packet to include information related to a frequency block and/or an entire bandwidth, and then transmitting the packet is described in further detail below with reference to FIG. 3 and FIGS. 4A-4B. In some embodiments, the techniques described herein are applicable to multi-link wireless communications and communications devices while in other embodiments, the techniques described herein are applicable to single-link wireless communications and communications devices.

Figure 3:
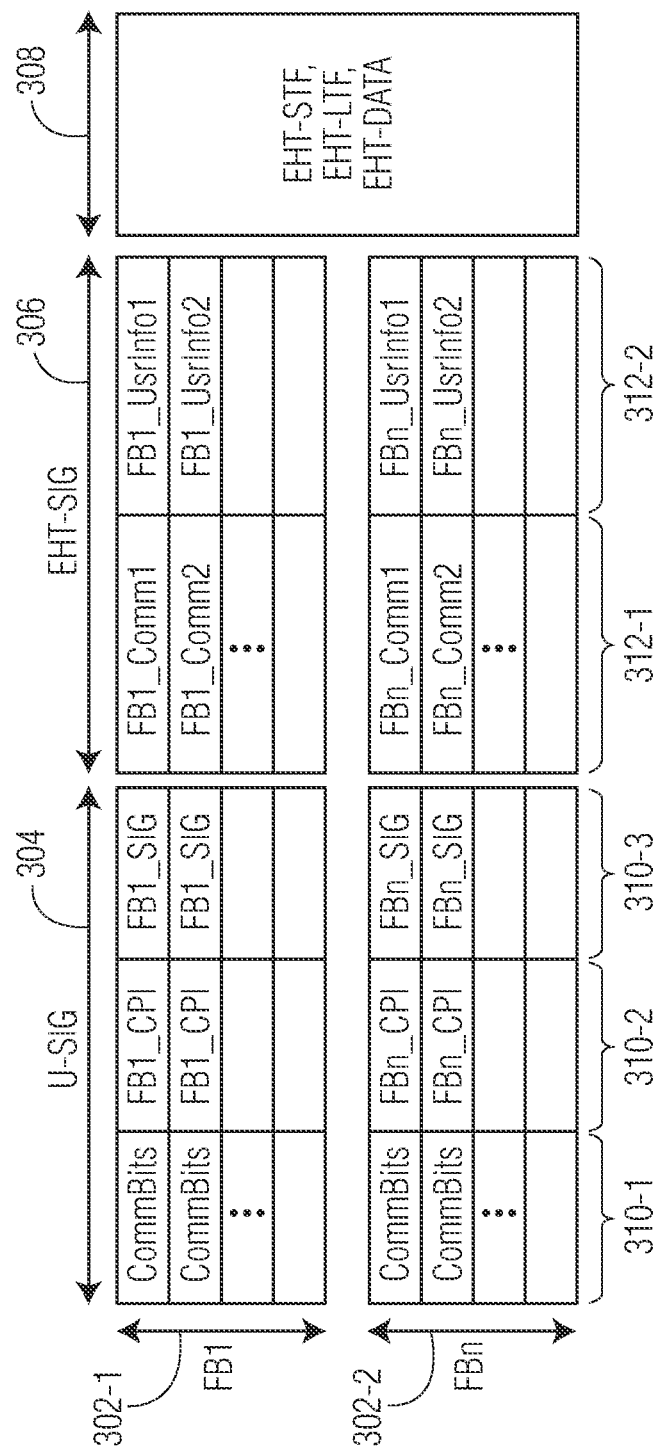
FIG. 3 depicts an example of a preamble portion of a packet.

FIG. 3 depicts an example of a preamble portion of a packet in accordance with an embodiment of the invention. In particular, FIG. 3 depicts content within a second preamble portion of a packet and a third preamble portion of the packet that span across multiple frequency blocks of a bandwidth and that may be implemented, for example, in the second preamble portion 204 and the third preamble portion 206 of the preamble 200 shown in FIG. 2. With reference to FIG. 3, a second preamble portion, implemented as U-SIG 304, a third preamble portion, implemented as EHT-SIG 306, and a WB preamble 308 are shown as spanning across a first frequency block, implemented as FB1 302-1, and across a second frequency block, implemented as FBn 302-2, such that "n" may be an integer greater than 1. In some embodiments, a size of the first frequency block and the second frequency block is a design parameter. For example, each frequency block may be 80 MHz or 160 MHz including multiple subchannels, (e.g., as shown by the four rows within FB1 302-1 and FBn 302-2), which may each be 20 MHz subchannels or 40 MHz subchannels.

The U-SIG field as shown in FIG. 3 includes a first U-SIG subfield 310-1 that includes a common information bit field (shown as CommBits), a second U-SIG subfield 310-2 that includes a CPI field related to FB1 302-1 (shown as FB1_CPI) and FBn 302-2 (shown as FBn_CPI), and a third U-SIG subfield 310-3 that includes a signal information field related to FB1 302-1 (shown as FB1_SIG) and FBn 302-2 (shown as FBn_SIG). Furthermore, the first U-SIG subfield 310-1, the second U-SIG subfield 310-2, and the third U-SIG subfield 310-3 may each include bits that are defined on a per-channel basis and that are repeated within at least one frequency block (e.g., FB1 302-1 or FBn 302-2) of a bandwidth. For example, the first FB1 content channel (e.g., first row of FB1 302-1) of the U-SIG field 304 may be repeated such that the content of the first FB1 content channel is implemented in the second FB1 content channel, the third FB1 20 MHz subchannel and the fourth FB1 20 MHz subchannel, respectively.

The EHT-SIG field as shown in FIG. 3 includes a first EHT-SIG subfield 312-1 that includes a common information field related to FB1 302-1 (shown as FB1_Comm1 and FB1_Comm2) and FBn 302-2 (shown as FBn_Comm1 and FBn_Comm2), as well as a second EHT-SIG subfield 312-2 that includes a user specific information field related to FB1 302-1 (shown as FB1_UsrInfo1 and FB1_UsrInfo2) and FBn 302-2 (shown as FBn_UsrInfo1 and FBn_UsrInfo2). Furthermore, the first EHT-SIG subfield 312-1 and the second EHT-SIG subfield 312-2 may each include bits that are defined on a two-channel (e.g., a two-content channel) basis and that are repeated within at least one frequency block (e.g., FB1 302-1 or FBn 302-2) of the bandwidth. For example, the first FB1 content channel (e.g., first row of FB1 302-1) of the EHT-SIG field 306, and the second FB1 content channel (e.g., second row of FB1 302-1) of the EHT-SIG field 306 may be repeated such that the content of the first FB1 content channel and the second FB1 content channel are implemented in the third FB1 20 MHz subchannel and the fourth FB1 20 MHz subchannel, respectively. The WB preamble 308 as shown in FIG. 3 includes an EHT Short Training Field (EHT-STF), an EHT Long Training Field (EHT-LTF), and an EHT data portion (EHT-DATA).

With reference to FIG. 3, from the U-SIG field on, information bits within a frequency block (e.g., FB1 302-1 or FBn 302-2) may signal information related to the frequency block. As an example, information related to the frequency block may include common information for each frequency block and frequency block-specific information, in which frequency block-specific information may be different across frequency blocks. In some embodiments, a wireless device (e.g., STA) that supports a maximum bandwidth larger than a frequency block size decodes the second preamble portion of the packet and the third preamble portion of the packet from more than one frequency block to attain information for decoding. In some embodiments, the wireless device (e.g., STA) that supports a maximum bandwidth larger than the frequency block size decodes the second preamble portion of the packet and the third preamble portion of the packet from each frequency block to attain information for decoding. In some embodiments, a wireless device (e.g., STA) that supports a maximum bandwidth less than or equal to the frequency block size, receives and decodes the second preamble portion of the packet and the third preamble portion of the packet from one frequency block to obtain information for decoding, such that the second preamble portion of the packet and the third preamble portion of the packet include signaling information for the entire bandwidth.

Figure 4A:
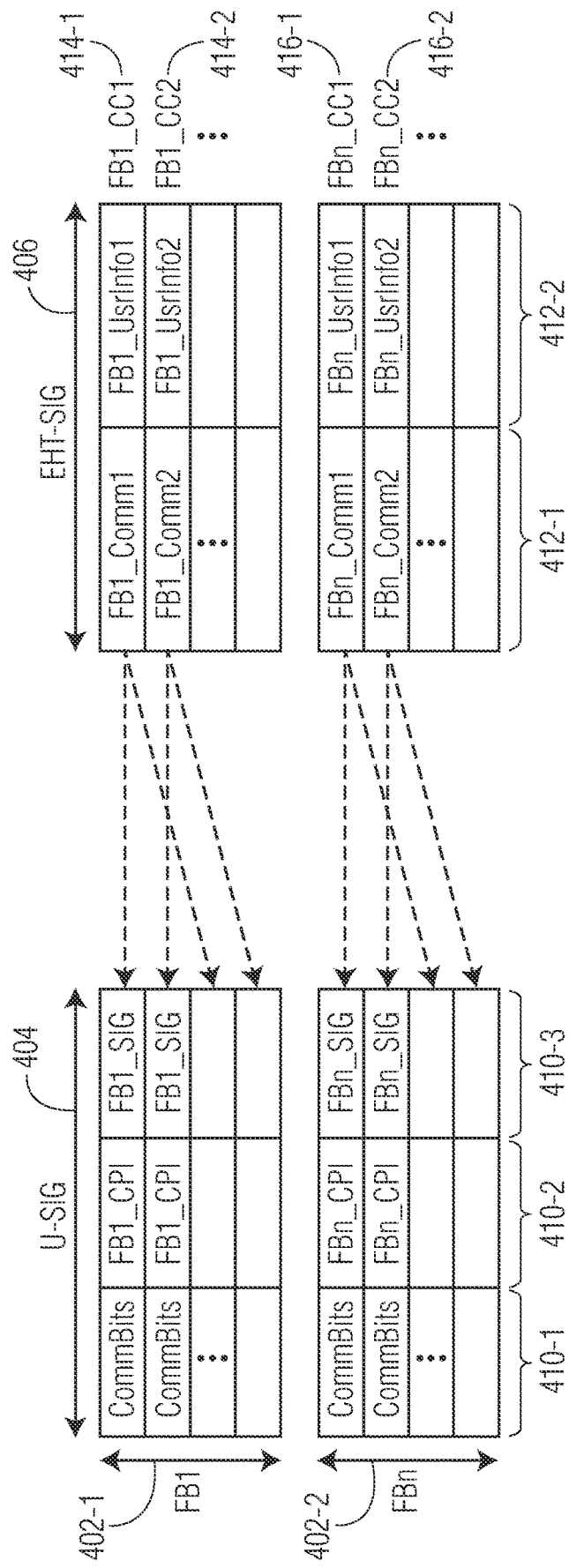
FIG. 4A illustrates an example of a technique for mapping a preamble portion of a packet in accordance with an embodiment of the invention.

FIG. 4A illustrates an example of a technique for mapping a preamble portion of a packet in accordance with an embodiment of the invention. In particular, FIG. 4A depicts content within a second preamble portion of a packet and a third preamble portion of the packet that span across multiple frequency blocks of a bandwidth and may be implemented in the second preamble portion 204 and the third preamble portion 206 of the preamble 200 shown in FIG. 2. In some embodiments, the bandwidth may be a range of frequencies within a given band (e.g., 160 MHz or 320 MHz) that may be used to transmit a PPDU. With reference to FIG. 4A, a second preamble portion, implemented as U-SIG 404, and a third preamble portion, implemented as EHT-SIG 406, are shown as spanning across a first frequency block, implemented as FB1 402-1, and across a second frequency block, implemented as FBn 402-2, such that "n" may be an integer greater than 1. The first frequency block, FB1 402-1, includes four 20 MHz subchannels (e.g., as shown by the four rows within FB1 402-1), in which two content channels are defined as, a first FB1 content channel of EHT-SIG 406, implemented as FB1_CC1 414-1, and a second FB1 content channel of EHT-SIG 406, implemented as FB1_CC2 414-2, that are each are repeated within FB1 402-1 of EHT-SIG 406. The second frequency block, FBn 402-2, also includes four 20 MHz subchannels (e.g., as shown by the four rows within FBn 402-2), in which two content channels are defined as, a first FBn content channel of EHT-SIG 406, implemented as FBn_CC1 416-1, and a second FBn content channel of EHT-SIG 406, implemented as FBn_CC2 416-2, are each repeated within FBn 402-2 of EHT-SIG 406.

The U-SIG field as shown in FIG. 4A includes a first U-SIG subfield 410-1 that includes a common information bit field (shown as CommBits), a second U-SIG subfield 410-2 that includes a CPI field related to FB1 402-1 (shown as FB1_CPI) and FBn 402-2 (shown as FBn_CPI), and a third U-SIG subfield 410-3 that includes a signal information field related to FB1 402-1 (shown as FB1_SIG) and FBn 402-2 (shown as FBn_SIG). Furthermore, the first U-SIG subfield 410-1, the second U-SIG subfield 410-2, and the third U-SIG subfield 410-3 may each include bits that are defined on a per-channel basis and that are repeated within each frequency block (e.g., FB1 402-1 and FBn 402-2) of a bandwidth.

The EHT-SIG field as shown in FIG. 4A includes a first EHT-SIG subfield 412-1 that includes a common information field related to FB1 402-1 (shown as FB1_Comm1 and FB1_Comm2) and FBn 402-2 (shown as FBn_Comm1 and FBn_Comm2), as well as a second EHT-SIG subfield 412-2 that includes a user specific information field related to FB1 402-1 (shown as FB1_UsrInfo1 and FB1_UsrInfo2) and FBn 402-2 (shown as FBn_UsrInfo1 and FBn_UsrInfo2). Furthermore, the first EHT-SIG subfield 412-1 and the second EHT-SIG subfield 412-2 may each include bits that are defined on a two-channel basis and that are repeated within each frequency block (e.g., FB1 402-1 and FBn 402-2) of the bandwidth. A first set of arrows (shown in FIG. 4A between U-SIG 404 and EHT-SIG 406 of FB1 402-1) illustrate a technique for content mapping in which the first EHT-SIG subfield 412-1 of FB1 402-1 and the second EHT-SIG subfield 412-2 of FB1 402-1 follow the third U-SIG subfield 410-3 of FB1 402-1 and are aligned such that the first FB1 content channel of EHT-SIG 406, FB1_CC1 414-1, and the second FB1 content channel of EHT-SIG 406, FB1_CC2 414-2, may be repeated on the two-channel basis within FB1 402-1 of EHT-SIG 406. In some embodiments, "aligned" may be interpreted as the first FB1 content channel and the second FB1 content channel of EHT-SIG 406 succeeding the FB1 subfields of U-SIG 404, such that the FB1 subfields of U-SIG 404 may include RA information and user information within FB1. In addition, the technique, as illustrated by a second set of arrows (shown between U-SIG 404 and EHT-SIG 406 of FBn 402-2) in which the first EHT-SIG subfield 412-1 of FBn 402-2 and the second EHT-SIG subfield 412-2 of FBn 402-2 follow the third U-SIG subfield 410-3 of FBn 402-2 and are aligned such that the first FBn content channel of EHT-SIG 406, FBn_CC1 416-1, and the second FBn content channel of EHT-SIG 406, FBn_CC2 416-2, may be repeated on the two-channel basis within FBn 402-2 of EHT-SIG 406. In some embodiments, "aligned" may be interpreted as the first FBn content channel and the second FBn content channel of EHT-SIG 406 succeeding the FBn content of U-SIG 404.

With reference to FIG. 4A, the first frequency block, FB1 402-1, and the second frequency block, FBn 402-2, may each be an 80 MHz channel, in which the four channels are each 20 MHz subchannels. Alternatively, the first frequency block, FB1 402-1, and the second frequency block, FBn 402-2, may each be a 160 MHz channel, in which there are eight 20 MHz subchannels. In addition, for a frequency block size of 80 MHz, the four 20 MHz subchannels within each frequency block may be assigned a given index, for example, FBn_CC1 416-1 of FBn 402-2 may have an index of 1, FBn_CC2 416-2 of FBn 402-2 may have an index of 2, and the third and fourth 20 MHz subchannels may have an index of 3 and 4, respectively. In some embodiments, EHT-SIG 406 uses the same content mapping technique as a High Efficiency Signal B (HE-SIGB) content channel as specified according to the 802.11ax communication protocol. According to such a technique, FBn_CC1 416-1 includes RA information and user specific information for 20 MHz subchannels with an odd index (starting index of 1) for "nth" frequency block (e.g., FBn 402-2) and FBn_CC2 416-2 includes RA information and user specific information for 20 MHz subchannels with an even index (starting index of 2) for "nth" frequency block (e.g., FBn 402-2), such that the four 20 MHz subchannels within each frequency block are assigned a given index (e.g., FBn_CC1 416-1 of FBn 402-2 has an index of 1, FBn_CC2 416-2 of FBn 402-2 has an index of 2, the third 20 MHz subchannel of FBn 402-2 has an index of 3, and the fourth 20 MHz subchannel of FBn 402-2 has an index of 4). Furthermore, the first EHT-SIG subfield 412-1 that includes the common information field may include RA bits and other common information bits for users (e.g., STAs), in which the RA bits may have compressed modes that save bits.

Figure 4B:
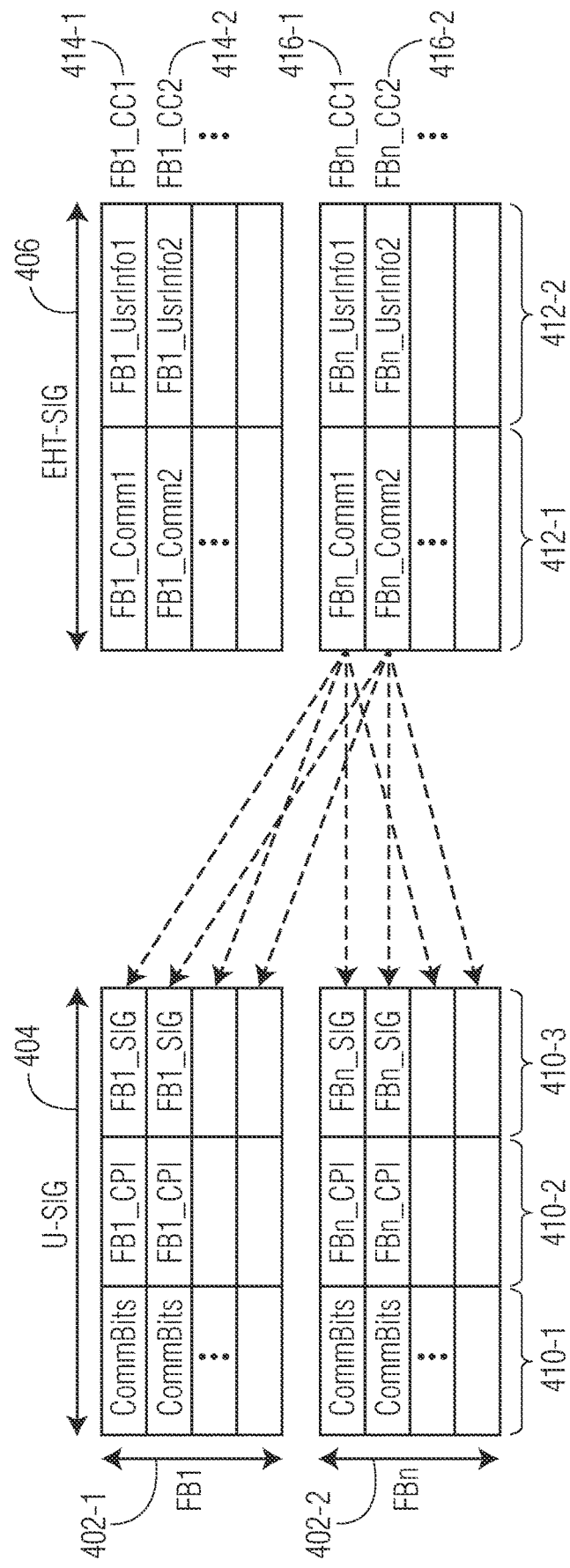
FIG. 4B illustrates another example of a technique for mapping a preamble portion of a packet in accordance with an embodiment of the invention.

FIG. 4B illustrates another example of a technique for mapping a preamble portion of a packet in accordance with an embodiment of the invention. In particular, FIG. 4B depicts content within a second preamble portion of a packet and a third preamble portion of the packet that span across multiple frequency blocks of a bandwidth and may be implemented in the second preamble portion 204 and the third preamble portion 206 of the preamble 200 shown in FIG. 2. In some embodiments, the bandwidth may be a range of frequencies within a given band (e.g., 160 MHz or 320 MHz) that may be used to transmit a PPDU. With reference to FIG. 4B, a second preamble portion, implemented as U-SIG 404, and a third preamble portion, implemented as EHT-SIG 406, are shown as spanning across a first frequency block, implemented as FB1 402-1, and a second frequency block, implemented as FBn 402-2. The first frequency block, FB1 402-1, includes four 20 MHz subchannels (e.g., as shown by the four rows within FB1 402-1), in which two content channels are defined as, a first FB1 content channel of EHT-SIG 406, implemented as FB1_CC1 414-1, and a second FB1 content channel of EHT-SIG 406, implemented as FB1_CC2 414-2, are each repeated within FB1 402-1 of EHT-SIG 406. The second frequency block, FBn 402-2, also includes four 20 MHz subchannels (e.g., as shown by the four rows within FBn 402-2), in which two content channels are defined as, a first FBn content channel of EHT-SIG 406, implemented as FBn_CC1 416-1, and a second FBn content channel of EHT-SIG 406, implemented as FBn_CC2 416-2, are each repeated within FBn 402-2 of EHT-SIG 406.

The U-SIG field as shown in FIG. 4B includes a first U-SIG subfield 410-1 that includes a common information bit field (shown as CommBits), a second U-SIG subfield 410-2 that includes a CPI field related to FB1 402-1 (shown as FB1_CPI) and FBn 402-2 (shown as FBn_CPI), and a third U-SIG subfield 410-3 that includes a signal information field related to FB1 402-1 (shown as FB1_SIG) and FBn 402-2 (shown as FBn_SIG). Furthermore, the first U-SIG subfield 410-1, the second U-SIG subfield 410-2, and the third U-SIG subfield 410-3 may each include bits that are defined on a per-channel basis and that are repeated within each frequency block (e.g., FB1 402-1 and FBn 402-2) of a bandwidth.

The EHT-SIG field as shown in FIG. 4B includes a first EHT-SIG subfield 412-1 that includes a common information field related to FB1 402-1 (shown as FB1_Comm1 and FB1_Comm2) and FBn 402-2 (shown as FBn_Comm1 and FBn_Comm2), as well as a second EHT-SIG subfield 412-2 that includes a user specific information field related to FB1 402-1 (shown as FB1_UsrInfo1 and FB1_UsrInfo2) and FBn 402-2 (shown as FBn_UsrInfo1 and FBn_UsrInfo2). Furthermore, the first EHT-SIG subfield 412-1 and the second EHT-SIG subfield 412-2 may each include bits that are defined on a two-channel basis and that are repeated within one frequency block (e.g., FB1 402-1 or FBn 402-2) of the bandwidth. A technique for content mapping, as illustrated by a set of arrows (shown in FIG. 4B between U-SIG 404 of FB1 402-1, U-SIG 404 of FBn 402-2, and EHT-SIG 406 of FBn 402-2), in which the first EHT-SIG subfield 412-1 of FBn 402-2 and the second EHT-SIG subfield 412-2 of FBn 402-2 follow the third U-SIG subfield 410-3 of FB1 402-1 and FBn 402-2 and are aligned such that the FBn subfields of EHT-SIG 406 in FBn_CC1 416-1 and FBn_CC2 416-2 may be repeated on the two-channel basis within FBn 402-6 of EHT-SIG 406, as well as across each frequency block of U-SIG 404. In some embodiments, the first EHT-SIG subfield 412-1 and the second EHT-SIG subfield 412-2 may include user information for the entire bandwidth.

With reference to FIG. 4B, the first frequency block, FB1 402-1, and the second frequency block, FBn 402-2, may each be an 80 MHz channel, in which the four channels are each 20 MHz subchannels. Alternatively, the first frequency block, FB1 402-1, and the second frequency block, FBn 402-2, may each be a 160 MHz channel, in which there are four channels that are each 40 MHz subchannels. In some embodiments, each frequency block (e.g., FB1 402-1 and FBn 402-2) has unique U-SIG content (e.g., CPI for each frequency block). In some embodiments, EHT-SIG 406 is repeated across frequency blocks, such that one frequency block (e.g., FBn 402-2 of EHT-SIG 406) includes resource unit (RU) allocation information and user specific information from each frequency block of an entire bandwidth. In such an embodiment, a wireless device (e.g., STA) that is parked on each frequency block (e.g., FB1 402-1 and FBn 402-2) can understand the RU allocation information of the entire bandwidth and find the wireless device's own RU allocation by decoding the EHT-SIG field on one frequency block that the wireless device parks on. Furthermore, in such an embodiment, each EHT-SIG subfield may signal the RU allocation information of mapped 20 MHz subchannels or 40 MHz subchannels. In some embodiments, wireless devices (e.g., STAs) that support a wider bandwidth than one frequency block may decode the preamble of each frequency block. In such an embodiment, a wireless device (e.g., STA) may decode total bandwidth information first so that the STA will know how many valid frequency blocks are in a PPDU. In such an embodiment, the STA may then extract CPI so that the STA will know which two 20 MHz subchannels may be used to decode EHT-SIG in each frequency block. In such an embodiment, EHT-SIG in each frequency block may be decoded and user specific information may be extracted. In such an embodiment, after decoding the EHT-SIG of each frequency block, the STA may combine EHT-SIG fields from different frequency blocks to enhance decoding reliability and know the STA's own allocated RU and related decoding information to decode the PPDU.

In some embodiments, users (e.g., STAs) may be allocated to a RU across more than one frequency block within a bandwidth. In some embodiments, a user (e.g., STA) may only be parked on one frequency block that may not be the primary frequency block. Thus, mapping of the user info blocks to the preamble of each frequency block in a PPDU needs to guarantee that the user(s) may obtain the user's decoding information from the one frequency block to the user(s) may be parked on. A technique for mapping user information to the third preamble portion (EHT-SIG) of the packet is described in further detail below with reference to FIG. 5.

Figure 5:
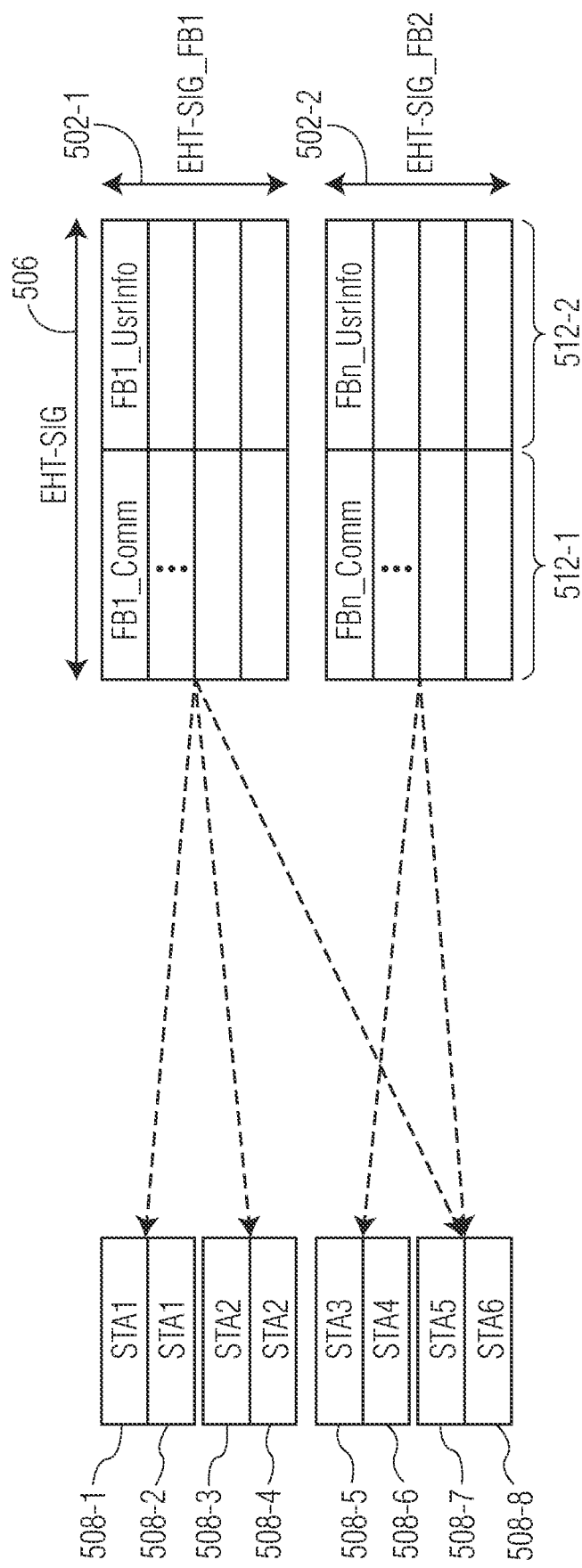
FIG. 5 illustrates an example of a technique for mapping user information to a preamble portion of a packet in accordance with an embodiment of the invention.

FIG. 5 illustrates an example of a technique for mapping user information to a preamble portion of a packet in accordance with an embodiment of the invention. In particular, FIG. 5 depicts STAs parked on subchannels within a bandwidth as well as subfields within a third preamble portion of a packet that span across multiple frequency blocks of the bandwidth and which may be implemented in the third preamble portion 206 of the preamble 200 shown in FIG. 2. With reference to FIG. 5, a third preamble portion, implemented as EHT-SIG 506 is shown as spanning across a first EHT-SIG frequency block, implemented as EHT-SIG_FB1 502-1, that includes four 20 MHz subchannels (e.g., as shown by the four rows within EHT-SIG_FB1 502-1), and a second EHT-SIG frequency block, implemented as EHT-SIG_FB2 502-2, that includes four 20 MHz subchannels (e.g., as shown by the four rows within EHT-SIG_FB2 502-2). The EHT-SIG field as shown in FIG. 5 includes a first EHT-SIG subfield 512-1 that includes a common information field related to EHT-SIG_FB1 502-1 (shown as FB1_Comm) and EHT-SIG_FB2 502-2 (shown as FBn_Comm), as well as a second EHT-SIG subfield 512-2 that includes a user specific information field related to EHT-SIG_FB1 502-1 (shown as FB1_UsrInfo) or EHT-SIG_FB2 502-2 (shown as FBn_UsrInfo). Furthermore, the common information field related to EHT-SIG_FB1 502-1 (shown as FB1_Comm) and EHT-SIG_FB2 502-2 (shown as FBn_Comm) may be repeated on a per-channel basis within the first EHT-SIG subfield 512-1 of each frequency block. The user specific information field related to EHT-SIG_FB1 502-1 (shown as FB1_UsrInfo) and EHT-SIG_FB2 502-2 (shown as FBn_UsrInfo) may also be repeated on a per-channel basis within the second EHT-SIG subfield 512-2 of each frequency block.

In addition, the EHT-SIG 506 of EHT-SIG_FB1 502-1 and EHT-SIG_FB2 502-2 are shown by the arrows as being mapped to corresponding STAs, implemented as STA1, STA2, STA3, STA4, STA5, and STA6. STA1, STA2, STA3, STA4, STA5, and STA6 each occupy at least one subchannel of the entire bandwidth, such that STA1 occupies a first 20 MHz subchannel 508-1 and a second 20 MHz subchannel 508-2, STA2 occupies a third 20 MHz subchannel 508-3 and a fourth 20 MHz subchannel 508-4, STA3 occupies a fifth 20 MHz subchannel 508-5, STA4 occupies a sixth 20 MHz subchannel 508-6, STA5 occupies a seventh 20 MHz subchannel 508-7, and STA6 occupies an eighth 20 MHz subchannel 508-8. In some embodiments, EHT-SIG 506 of EHT-SIG_FB1 502-1 includes user information for STA1, STA2, STA5 and optionally, STA6 (e.g., as shown by arrows extending from EHT-SIG 506 of EHT-SIG_FB1 502-1). In some embodiments, EHT-SIG 506 of EHT-SIG_FB2 502-2 includes user information for STA3, STA4, STA6 and optionally, STA5 (e.g., as shown by arrows extending from EHT-SIG 506 of EHT-SIG_FB2 502-2).

With reference to FIG. 5, the user specific information field of the second EHT-SIG subfield 512-2 may be ordered according to a sequence of a corresponding location of occupied RUs (e.g., 20 MHz subchannels). In some embodiments, the content of EHT-SIG 506 in one frequency block (e.g., EHT-SIG_FB1 502-1 or EHT-SIG_FB2 502-2) includes RA information for each frequency block (e.g., EHT-SIG_FB1 502-1 and EHT-SIG_FB2 502-2) that is allocated to one or more STAs parked on the content channels of a frequency block. As an example, EHT-SIG_FB1 502-1 may be a primary frequency block that STA1, STA2, and STA5 are parked on. In such an example, EHT-SIG 506 of EHT-SIG_FB1 502-1 includes RA information for STA1, STA2, STA5, and optionally, STA6, while EHT-SIG 506 of EHT-SIG_FB2 502-2 includes RA information for STA3, STA4, STA6, and optionally, STA5. The RA information for STA6 and STA5 may be optionally included in EHT-SIG 506 of EHT-SIG_FB1 502-1 and EHT-SIG 506 of EHT-SIG_FB2 502-2, respectively, as STA5 and STA6 may be operating in MUMIMO transmission.

With further reference to FIG. 5, the common information field of the first EHT-SIG subfield (shown as FB1_Comm and FBn_Comm) may include frequency RA bits that indicate the RA of each frequency block of an entire bandwidth. In some embodiments, for a primary frequency block, the RA bits may signal the entire bandwidth. In such an embodiment, the RA bits incorporate a scenario wherein some STAs parked on the primary frequency block are allocated to a secondary frequency block. In such an embodiment, if all STAs parked on the primary frequency block are allocated within the primary frequency block, then the RA bits may only need to cover the primary frequency block. In some embodiments, for the secondary frequency block, the RA bits may include the secondary frequency block. However, STAs parked on the secondary frequency block may not be allocated to the primary frequency block. In addition, the user specific information field of the second EHT-SIG subfield (shown as FB1_UsrInfo and FBn_UsrInfo) may not need to know the RA information for a STA that is not parked in the EHT-SIG's corresponding frequency block. As an example, STA6, as shown in FIG. 5, is not parked on EHT-SIG_FB1 502-1, therefore the STAs in EHT-SIG_FB1 502-1 may not need to know the RA information for STA6. In such an example, the user specific information field for STA6 may use (i) a dummy Association ID (AID) (e.g., AID=2046) to spoof STAs parked on the frequency block of STA6, or (ii) a real AID of an allocated STA.

With further reference to FIG. 5, when a STA is not parked on a frequency block of a bandwidth, the frequency block may be skipped using a user skipping signaling technique. The user skipping signaling technique may be implemented in an EHT-SIG (e.g., EHT-SIG 506) of a frequency block (e.g., EHT-SIG_FB1 502-1) via a common information field or a user specific information field. In one embodiment, implementing the user skipping signaling technique via the common information field may involve signaling information on whether one frequency block of an RA is allocated to one or more STAs parked on a primary frequency block. In such an embodiment, one bit is used to indicate that the existence of a STA on the primary frequency block is allocated to a RA block. As an example, a "center-26 RU" bit may be repurposed for each 80 MHz segment. As another example, one bit may be added to each entry of an RA table. In another embodiment, implementing the user skipping signaling technique via the user specific information field may involve, in the user specific information field of the last STA of each 20 MHz channel, 80 MHz channel, or 160 MHz channel, using one bit to indicate whether to skip the next RU covering the next 20 MHz channel, 80 MHz channel, or 160 MHz channel.

In some embodiments, each frequency block may use a different RA compression mode or may have a different number of users, causing the length of an EHT-SIG field in a packet to be different across frequency blocks and/or errors in decoding. Thus, as Orthogonal Frequency Division Multiplexing (OFDM) orthogonality is required within the packet, some padding is necessary to ensure that the EHT-SIG fields across frequency blocks have the same number of symbols. EHT-SIG padding is described in further detail with reference to FIG. 6.

Figure 6:
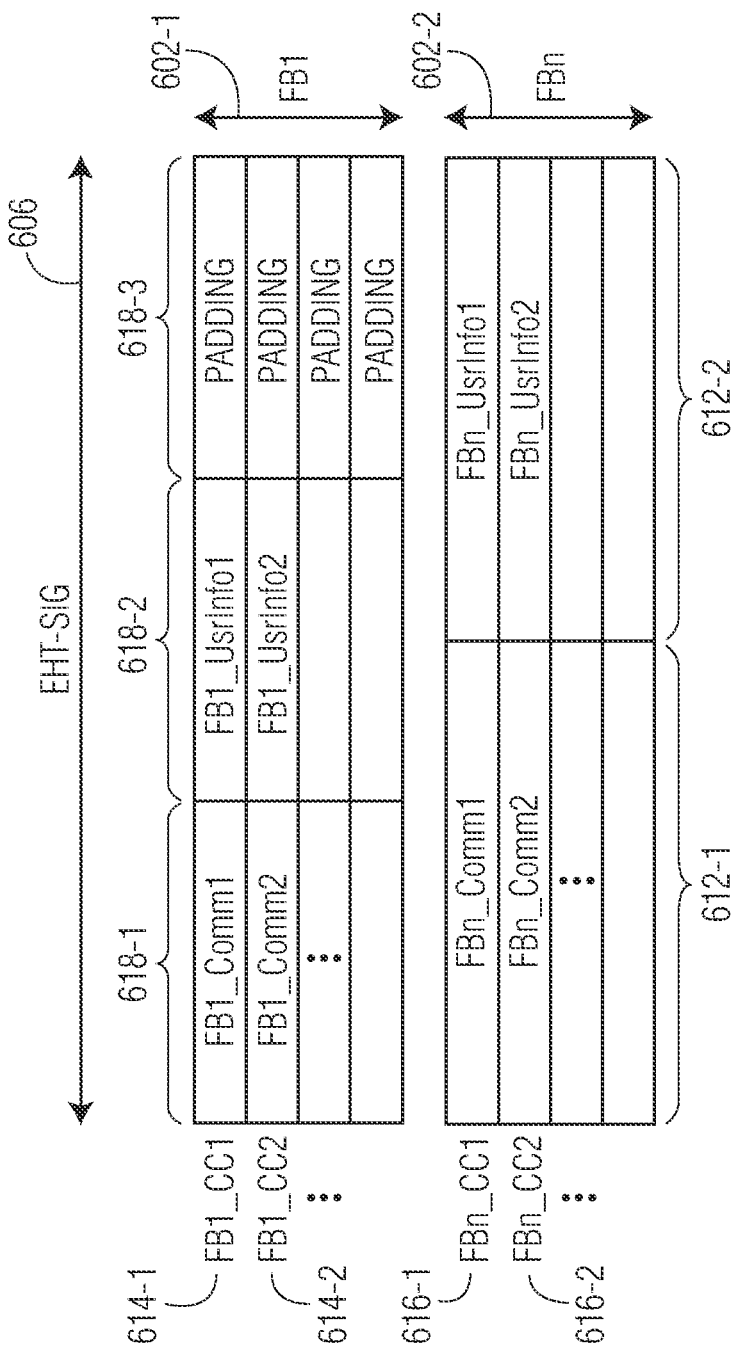
FIG. 6 depicts another example of a preamble portion of a packet in accordance with an embodiment of the invention.

FIG. 6 depicts an example of a preamble portion of a packet in accordance with an embodiment of the invention. In particular, FIG. 6 depicts an EHT-SIG field of a preamble of a packet with a padding subfield that ensures the same number of symbols across frequency blocks that may be implemented in the third preamble portion 206 of the preamble 200 shown in FIG. 2. With reference to FIG. 6, a third preamble portion of a packet, implemented as EHT-SIG 606, is shown as spanning across a first frequency block, implemented as FB1 602-1, and a second frequency block, implemented as FBn 602-2. The first frequency block, FB1 602-1, includes four 20 MHz subchannels (e.g., as shown by the four rows within FB1 602-1), in which two content channels are defined as, a first FB1 content channel of EHT-SIG 606, implemented as FB1_CC1 614-1, and a second FB1 content channel of EHT-SIG 606, implemented as FB1_CC2 614-2, are each repeated within FB1 602-1 of EHT-SIG 606. For example, the first FB1 content channel of EHT-SIG 606, implemented as FB1_CC1 614-1, and the second FB1 content channel of EHT-SIG 606, implemented as FB1_CC2 614-2 may be repeated such that the content of the first FB1 content channel and the second FB1 content channel are implemented in the third FB1 20 MHz subchannel and the fourth FB1 20 MHz subchannel, respectively. The second frequency block, FBn 602-2, also includes four 20 MHz subchannels (e.g., as shown by the four rows within FBn 602-2), in which two content channels are defined as, a first FBn content channel of EHT-SIG 606, implemented as FBn_CC1 616-1, and a second FBn content channel of EHT-SIG 606, implemented as FBn_CC2 616-2, are each repeated within FBn 602-2 of EHT-SIG 606. For example, the first FBn content channel of EHT-SIG 606, implemented as FBn_CC1 616-1, and the second FBn content channel of EHT-SIG 606, implemented as FBn_CC2 616-2 may be repeated such that the content of the first FBn content channel and the second FBn content channel are implemented in the third FBn 20 MHz subchannel and the fourth FBn 20 MHz subchannel, respectively. The EHT-SIG field in FB1 602-1 includes a first EHT-SIG subfield 618-1 that includes a common information field related to FB1 602-1 (shown as FB1_Comm1 and FB1_Comm2), a second EHT-SIG subfield 618-2 that includes a user specific information field related to FB1 602-1 (shown as FB1_UsrInfo1 and FB1_UsrInfo2), and a third EHT-SIG subfield 618-3 that includes a padding field. In some embodiments, the padding field may be used to ensure OFDM orthogonality and that the EHT-SIG fields across multiple frequency blocks (e.g., FB1 602-1 and FBn 602-2) have the same number of signals. In addition, the EHT-SIG field of FBn 602-2 includes a first EHT-SIG subfield 612-1 that includes a common information field related to FBn 602-2 (shown as FBn_Comm1 and FBn_Comm2) and a second EHT-SIG subfield 612-2 that includes a user specific information field related to FBn 602-2 (shown as FBn_UsrInfo1 and FBn_UsrInfo2). Furthermore, the first EHT-SIG subfield 612-1 and the second EHT-SIG subfield 612-2 may each include bits that are defined on a two-channel basis and that are repeated within at least one frequency block (e.g., FB1 602-1 or FBn 602-2) of a bandwidth.

With reference to FIG. 6, a transmitter may use one of three techniques to ensure a third preamble portion of a packet (e.g., EHT-SIG) has the same number of symbols across each frequency block. According to a first technique, the transmitter may pad random bits in a padding field to fill an EHT-SIG of a frequency block that has less symbols than the EHT-SIG of another frequency block. According to a second technique, the transmitter may repeat EHT-SIG symbols to fill an EHT-SIG of a frequency block with fewer symbols so that the number of symbols in the EHT-SIG of the frequency block is the same as the EHT-SIG of the frequency block with the largest number of symbols. According to a third technique, the transmitter may elect a different Modulation and Coding Scheme (MCS) for each frequency block so that the number of symbols in each EHT-SIG of each frequency block is the same.

Figure 9:
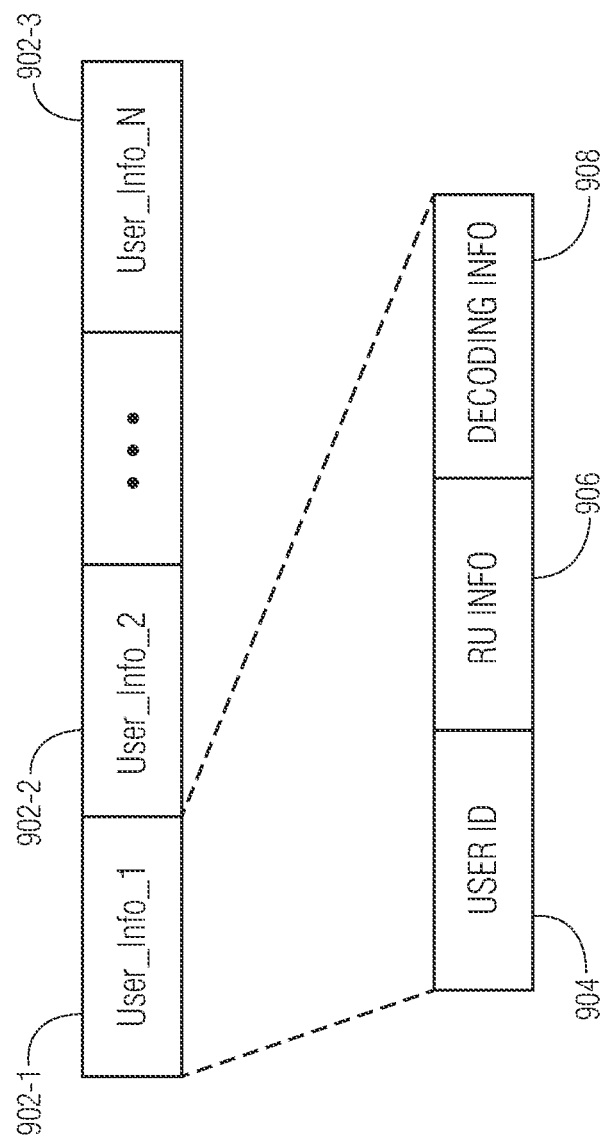
FIG. 9 depicts another example of a preamble portion of a packet in accordance with an embodiment of the invention.

FIG. 7A depicts an example of an RA table that represents encoding in accordance with an embodiment of the invention. In particular, FIG. 7A depicts a table for 8-bit RA signaling that is in accordance with the 802.11ax communication protocol signaling and that represents encoding which may be implemented in an RU info field (e.g., RU info field 906) of a user information block (e.g., User_Info_1 902-1) as shown in FIG. 9. With reference to FIG. 7A, an 8-bit RA table 700-1, may include a first column for RU combinations, implemented as RU combinations, a second column for entries, and a third column for an example of the 8 RA bits. In one embodiment, for an RU combination of 242, an entry may be 4+3, and the 8 RA Bits may be 0xxxxxxx. In one embodiment, for an RU combination of 484, the entry may be 3+3, and the 8 RA Bits may be 10xxxxxx. In one embodiment, for an RU combination of 996, the entry may be 2+3, and the 8 RA Bits may be 110xxxxx. In one embodiment, for an RU combination of 996*2, the entry may be 1+3, and the 8 RA Bits may be 1110xxxx. In one embodiment, for an RU combination of 996*3, the entry may be 1+3, and the 8 RA Bits may be 1111xxxx.

FIG. 7B depicts another example of an RA table that represents encoding in accordance with an embodiment of the invention. In particular, FIG. 7B depicts a table for 9-bit RA signaling that is in accordance with the 802.11ax communication protocol signaling and that represents encoding which may be implemented in an RU info field (e.g., RU info field 906) of a user information block (e.g., User_Info_1 902-1) as shown in FIG. 9. With reference to FIG. 7B, a 9-bit RA table, implemented as 9-bit RA table 700-2, may include a first column for RU combinations, implemented as RU combinations, a second column for entries, and a third column for an example of 9 RA bits, implemented as the 9 RA Bits. In one embodiment, for an RU combination of 52, an entry may be 6, and the 9 RA Bits may be 000xxxxxx. In one embodiment, for an RU combination of 106, the entry may be 5+1, and the 9 RA Bits may be 001xxxxxx. In such an embodiment, 5-bits of the 5+1 entry may be for a 106 tone RU location and 1-bit of the 5+1 entry may be for a 26 aggregation. In one embodiment, for an RU combination of 242, the entry may be 4+3, and the 9 RA Bits may be 01xxxxxxx. In such an embodiment, 4-bits of the 4+3 entry may be for 242 tone RU location and 3-bits of the 4+3 entry may be for consecutive RUs. In one embodiment, for an RU combination of 484, the entry may be 3+3, and the 9 RA Bits may be 100xxxxxx. In one embodiment, for an RU combination of 996, the entry may be 2+3, and the 9 RA Bits may be 1010xxxxx. In one embodiment, for an RU combination of 996*2, the entry may be 1+3, and the 9 RA Bits may be 10110xxxx. In one embodiment, for an RU combination of 996*3, the entry may be 1+3, and the 9 RA Bits may be 10111xxxx.

With reference to FIGS. 7A-7B, RA signaling with RU signaling using the 8-bit RA table 700-1 or the 9-bit RA table 700-2 may be used by an RU info field (e.g., RU info field 906) within each user information block (e.g., User_Info_1 902-1) to signal an exact location and an RU size for a user (e.g., STA). In some embodiments, RU signaling with the 8-bit RA table 700-1 or the 9-bit RA table 700-2 may limit minimum RU size to be larger than a certain value (e.g., RU 52, RU 242, etc.). In some embodiments, RU signaling with the 8-bit RA table 700-1 or the 9-bit RA table 700-2 may limit maximum number of users to be less than a specified amount (e.g., 32, 16, 8, etc.).

FIG. 8A depicts an example of an Nss signaling table that represents encoding in accordance with an embodiment of the invention. In particular, FIG. 8A depicts a table for Nss signaling that is in accordance with the 802.11ax communication protocol Nss signaling in which 6-bits that represent encoding may be implemented in a Decoding info field (e.g., Decoding info field 908) of a user information block (e.g., User_Info_1 902) as shown in FIG. 9. With reference to FIG. 8A, a 6-bit Nss signaling table 800-1, may include a first column for an assigned Nss, implemented as Assigned Nss, and a second column for entries. In one embodiment, for an Assigned Nss of 16ss, an entry may be 1. In one embodiment, for an Assigned Nss of 12ss, the entry may be 5. In one embodiment, for an Assigned Nss of 8ss, the entry may be 9. In one embodiment, for an Assigned Nss of 4ss, the entry may be 13. In one embodiment, for an Assigned Nss of 2ss, the entry may be 15. In one embodiment, for an Assigned Nss of 1ss, the entry may be 16. Furthermore, in the 6-bit Nss signaling table, combinations for certain assigned Nss are removed from an Nss signaling table in accordance with the 802.11ax communication protocol. Combinations for assigned Nss that are removed from the Nss signaling table in accordance with the 802.11ax communication protocol may include all odd number of streams (except for 1ss), 14ss, 10ss and 6ss.

FIG. 8B depicts another example of an Nss signaling table that represents encoding in accordance with an embodiment of the invention. In particular, FIG. 8B depicts a table for Nss signaling that is in accordance with the 802.11ax communication protocol Nss signaling in which 7-bits that represent encoding which may be implemented in a Decoding info field (e.g., Decoding info field 908) of a user information block (e.g., User_Info_1 902) as shown in FIG. 9. With reference to FIG. 8B, a 7-bit Nss signaling table 800-2, may include a first column for an assigned Nss, implemented as Assigned Nss, and a second column for entries. In one embodiment, for an Assigned Nss of 16ss, an entry may be 1. In one embodiment, for an Assigned Nss of 14ss, the entry may be 3. In one embodiment, for an Assigned Nss of 12ss, the entry may be 5. In one embodiment, for an Assigned Nss of 10ss, the entry may be 7. In one embodiment, for an Assigned Nss of 8ss, the entry may be 9. In one embodiment, for an Assigned Nss of 6ss, the entry may be 11. In one embodiment, for an Assigned Nss of 4ss, the entry may be 13. In one embodiment, for an Assigned Nss of 2ss, the entry may be 15. In one embodiment, for an Assigned Nss of 1ss, the entry may be 16. Furthermore, in the 7-bit Nss signaling table, combinations for certain assigned Nss are removed from the Nss signaling table in accordance with the 802.11ax communication protocol. Combinations for assigned Nss that are removed from the Nss signaling table in accordance with the 802.11ax communication protocol may include all odd number of streams (except for 1ss).

With reference to FIGS. 8A-8B, as user (e.g., STA) location may not be matched with an RU location in RA signaling, Nss signaling may be without dependence on another user's location in a multi-user group. In addition to the 6-bit Nss signaling table 800-1 and the 7-bit Nss signaling table 800-2, Nss signaling may also use an 8-bits Nss signaling table. However, limiting the Nss signaling table to 7-bits or 6-bits has the potential to improve signaling efficiency by removing unwanted combinations for certain assigned Nss.

To support up to 320 MHz of bandwidth in accordance with the EHT communication protocol, new techniques may be needed for encoding RA bits in EHT-SIG as the 802.11ax communication protocol HE-SIGB signaling technique does not support the length of the RA bits in EHT-SIG. Thus, to support signaling for a bandwidth greater than 160 MHz, several techniques for RA signaling according to the EHT communication protocol and the next-generation communication protocols are described herein. In one embodiment, a technique to support signaling for a bandwidth greater than 160 MHz may involve a new RA table. According to such a technique, the new RA table may reuse the 802.11ax RA signaling technique by implementing the new RA table with a sequential user specific information field, redesign the new RA table to consider wider bandwidths, and limit the total number of users supported. In another embodiment, the technique to support signaling for a bandwidth greater than 160 MHz may involve self-contained RA signaling. According to such a technique, separate RA bits for the frequency blocks may not be needed, user specific information may be directly signaled in sequence, and RA to each user is included in the user's user specific information block. Self-contained RA signaling is described in further detail with reference to FIG. 9, FIG. 10, and FIG. 11.

FIG. 9 depicts another example of a preamble portion of a packet in accordance with an embodiment of the invention. In particular, FIG. 9 depicts user information blocks with self-contained user specific information that may be implemented in the third preamble portion 206 of the preamble 200 shown in FIG. 2. With reference to FIG. 9, a first user information block, implemented as User_Info_1 902-1, a second user information block, implemented as User_Info_2 902-2, and an "Nth" user information block, implemented as User_Info_N 902-3, are shown. In some embodiments, "N" may be an integer greater than 2. In addition, an expanded view of User_Info_1 902-1 is shown as including a User ID field 904, an RU info field 906 and a Decoding info field 908, such that the RU info field 906 may include an RU allocation for User_Info_1 902-1 and the Decoding info field 908 may include decoding related information (e.g., MCS, number of Spatial Streams (Nss), etc.) for User_Info_1 902-1. User_Info_2 902-2, and User_Info_N 902-3 may also include a User ID field (not shown), an RU Info field (not shown) with RU allocation, and a Decoding info field (not shown) with decoding related information (e.g., MCS, Nss, etc.) that are each relevant to the respective user information block (e.g., User_Info_2 902-2 or User_Info_N 902-3).

With reference to FIG. 9, because the user information blocks are self-contained, self-contained RU signaling does not need RA bits in a third preamble portion of a packet. As a result, the user information blocks (e.g., User_Info_1 902-1, User_Info_2 902-2, and User_Info_N 902-3) may be transmitted in a random sequence or in sequence of the RU that the user information block is allocated. In some embodiments, the user information blocks (e.g., User_Info_1 902-1, User_Info_2 902-2, and User_Info_N 902-3) may be encoded and modulated using a per 80 MHz encoding structure. In the per 80 MHz encoding structure, user information blocks (e.g., User_Info_1 902-1, User_Info_2 902-2, and User_Info_N 902-3) within one 80 MHz channel are encoded together and modulated onto four 20 MHz subchannels. In some embodiments, the user information blocks (e.g., User_Info_1 902-1, User_Info_2 902-2, and User_Info_N 902-3) may be encoded and modulated using a per 20 MHz encoding structure. In the per 20 MHz encoding structure, user information blocks (e.g., User_Info_1 902-1, User_Info_2 902-2, and User_Info_N 902-3) for users (e.g., STAs) allocated to each 20 MHz subchannel are encoded together and modulated on a specific 20 MHz subchannel. Furthermore, users (e.g., STAs) that are assigned to an RU greater than 242 may have flexibility to be signaled in any one of the 20 MHz subchannels in an 80 MHz segment that STAs are parked on.

Figure 10:
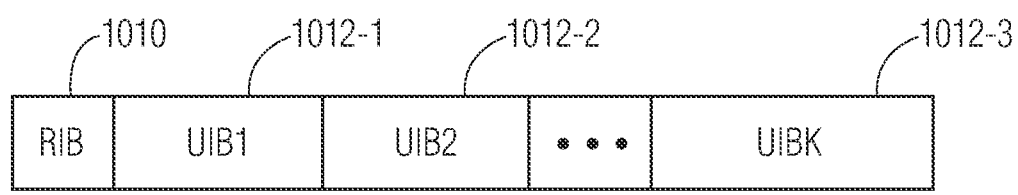
FIG. 10 depicts another example of a preamble portion of a packet in accordance with an embodiment of the invention.

FIG. 10 depicts another example of a preamble portion of a packet in accordance with an embodiment of the invention. In particular, FIG. 10 depicts an RU allocation block (RAB) that may be implemented in the third preamble portion 206 of the preamble 200 shown in FIG. 2. With reference to FIG. 10, a RAB, implemented as RAB 1020, includes a RIB, implemented as RIB 1010, a first user information block, implemented as UIB1 1012-1, a second user information block, implemented as UIB2 1012-2, and a "Kth" user information block, implemented as UIBK 1012-3, are shown. In some embodiments, "K" may be an integer greater than 2. In some embodiments, RAB 1020 includes RA information within the RIB 1010 which can be split into multiple RABs across a frequency block or bandwidth. In some embodiments, RAB 1020 signals a portion of users (e.g., STAs) allocated to an RU. In some embodiments, RIB 1010 of RAB 1020 signals absolute location of an RU, as well as OFDMA or Multi-user Multiple-Input and Multiple-Output (MUMIMO) information. In such an embodiment, in an OFDMA transmission, RIB 1010 indicates which small RUs are included in RAB 1020. In such an embodiment, for a MUMIMO transmission, RIB 1010 indicates how many users (e.g., STAs) are included in RAB 1020. In some embodiments, the user information blocks (e.g., UIB1 1012-1, UIB2 1012-2, or UIBK 1012-3) signal user ID and user modulation/encoding information. In some embodiments, the third preamble portion of the packet as shown in FIG. 10 indicates RA by cascading RA bits (e.g., RIB 1010) from each frequency block followed by cascading user information bits (e.g., UIB1 1012-1, UIB2 1012-2, and UIBK 1012-3) from each frequency block.

With reference to FIG. 10, overhead of RA information bits within a RIB in an OFDMA transmission may be reduced by predefining certain OFDMA RA modes. In some embodiments, predefining certain OFDMA modes may be implemented by indicating an OFDMA mode in a PHY header, such that a user (e.g., STA) will know the user's RA information. In one embodiment, indicating the OFDMA mode in the PHY header may be implemented via a schematic scheme. In such an embodiment, the schematic scheme may involve predefining one or more OFDMA modes and using a PHY signal (PHY SIG) field to signal which mode is used. In another embodiment, indicating the OFDMA mode in the PHY header may be implemented via a semi-static scheme. In such an embodiment, the semi-static scheme may involve the PHY SIG field reserving some signaling field to indicate OFDMA compressed modes. In such an embodiment, an exact definition of each mode may be announced by a control frame of an AP, in which the AP may (i) announce the exact definition of each mode in the AP's beacons, (ii) periodically update definitions of OFDMA compression modes or change definitions of OFDMA compression modes on-demand, and (iii) make changes based on traffic patterns and STA status statistics.

Figure 11:
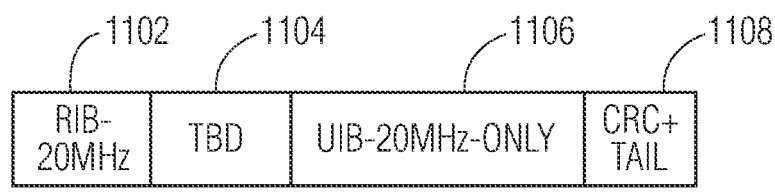
FIG. 11 depicts another example of a preamble portion of a packet in accordance with an embodiment of the invention.

FIG. 11 depicts another example of a preamble portion of a packet in accordance with an embodiment of the invention. In particular, FIG. 11 depicts a RAB that may be implemented in the third preamble portion 206 of the preamble 200 shown in FIG. 2. With reference to FIG. 11, a RAB, implemented as RAB 1120, includes a RIB for a 20 MHz subchannel, implemented as RIB-20 MHz 1102, a to be determined (TBD) block, implemented as TBD 1104, a UIB for the 20 MHz subchannel, implemented as UIB-20 MHz-only 1106, and a cyclic redundancy check (CRC) with tail block, implemented as CRC+TAIL 1108. In some embodiments, the RAB 1120 may be encoded in a separate Binary Convolution Codes (BCC) code block. In some embodiments, RIB-20 MHz 1102 may include bits for a corresponding RU location of a STA in a 20 MHz subchannel only. In some embodiments, the TBD block 1104 may be defined according to the EHT communication protocol, the next-generation communication protocol, and future communication protocols. In some embodiments, UIB-20 MHz-only 1106 may include bits for the STAs in the 20 MHz subchannel only.

With reference to FIG. 11, the RAB 1120 may be used in self-contained RA signaling where a STA may only be in a 20 MHz subchannel. When the stay may only be in the 20 MHz subchannel, the STA may only be able to decode in one 20 MHz subchannel. Thus, the STA's information may have to be signaled in the one 20 MHz subchannel. In some embodiments, forming a separate RAB (e.g., RAB 1120) that contains RA for the STA in the 20 MHz subchannel allows the STA in the 20 MHz subchannel to decode the STA's RU location.

Figure 12:
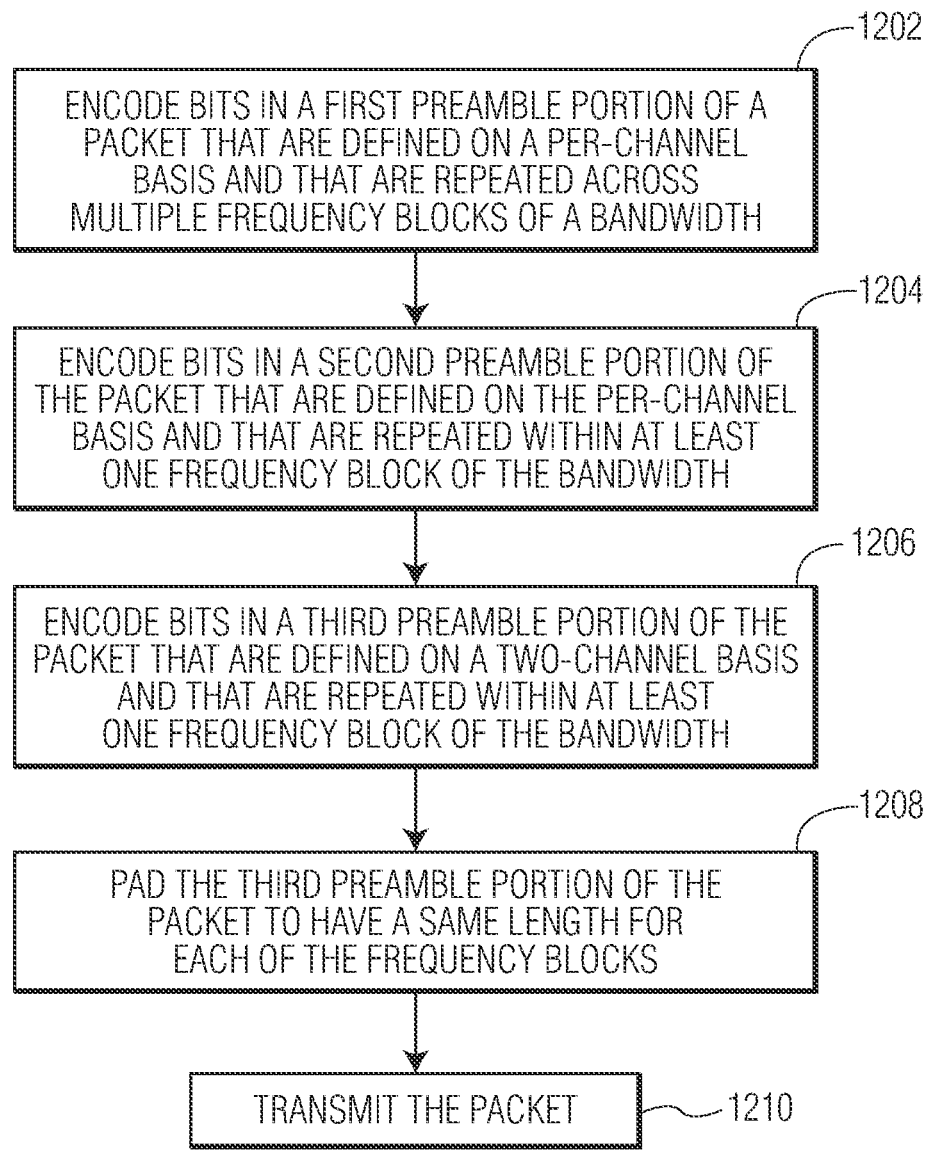
FIG. 12 illustrates a flow diagram of a technique for wireless communication in accordance with an embodiment of the invention.

FIG. 12 illustrates a flow diagram of a technique for wireless communication in accordance with an embodiment of the invention. At block 1202, bits are encoded in a first preamble portion of a packet that are defined on a per-channel basis and that are repeated across multiple frequency blocks of a bandwidth. At block 1204, bits are encoded in a second preamble portion of the packet that are defined on the per-channel basis and that are repeated within at least one frequency block of the bandwidth. At block 1206, bits are encoded in a third preamble portion of the packet that are defined on a two-channel basis and that are repeated within at least one frequency block of the bandwidth. At block the third preamble portion of the packet is padded to have a same length for each of the frequency blocks. At block 1210, the packet is transmitted.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method performed by a multi-link communications system for wireless communications within a bandwidth that includes first and second frequency blocks, wherein the multi-link communications system includes a first access point configured to operate in the first frequency block and a second access point configured to operate in the second frequency block, and wherein each of the first and second frequency blocks includes first, second, third, and fourth channels, the method comprising:
    encoding, for the first access point and for the second access point, first bits in a first preamble portion of a packet, wherein the first bits are defined on a per-channel basis and the first bits are repeated across the first, second, third, and fourth channels of each of the first and second frequency blocks of the bandwidth;
    encoding, for the first access point and for the second access point, second bits in a second preamble portion of the packet, wherein the second preamble portion of the packet is a Universal Signal (U-SIG) portion of the packet, and the second bits are defined on the per-channel basis and the second bits are repeated across the first, second, third, and fourth channels of at least one of the first and second frequency blocks of the bandwidth;
    encoding, for the first access point, third bits in a third preamble portion of the packet, wherein the third preamble portion is an Extremely High Throughput Signal (EHT-SIG) portion of the packet, the third preamble portion for the first access point includes a common information field, a user specific information field, and a padding field, the third bits are defined on a two-channel basis, the third bits include resource allocation (RA) bits from the first frequency block, and the third bits are repeated in the common information field and in the user specific information field across the first, second, third, and fourth channels of the first frequency block of the bandwidth;
    encoding, for the second access point, fourth bits in the third preamble portion of the packet, wherein the third preamble portion for the second access point includes the common information field and the user specific information field, but does not include the padding field, wherein the fourth bits are defined on the two-channel basis, the fourth bits include RA bits from the second frequency block, the fourth bits are repeated in the common information field and in the user specific information field across the first, second, third, and fourth channels of the second frequency block of the bandwidth, and the fourth bits are different from the third bits in the common information field and in the user specific information field; and
    transmitting the packet in the first and second frequency blocks.

2. The method of claim 1, wherein encoding bits in the second preamble portion of the packet that are defined on the per-channel basis are repeated within each frequency block of the bandwidth.

3. The method of claim 1, the method further comprising: receiving the second preamble portion of the packet and the third preamble portion of the packet from multiple frequency blocks.

4. The method of claim 1, wherein the third preamble portion of the packet indicates RA by cascading RA information from each frequency block.

5. The method of claim 1, wherein the third preamble portion of the packet indicates RA by cascading the RA bits from each frequency block followed by cascading user information bits from each frequency block.

6. The method of claim 1, wherein the user specific information field includes frequency RA bits, which indicate the RA of each frequency block, and the frequency RA bits use at least one of 8 bits and 9 bits.

7. The method of claim 1, wherein the user specific information field includes number of spatial stream (Nss) bits, and the Nss bits use at least one of 6 bits, 7 bits, and 8 bits.

8. The method of claim 1, the method further comprising: receiving the second preamble portion of the packet and the third preamble portion of the packet from one frequency block, wherein the second preamble portion of the packet and the third preamble portion of the packet include signaling information for the entire bandwidth.

9. The method of claim 1, wherein a wireless device that supports a maximum bandwidth of at least one of less than and equal to a frequency block size decodes the second preamble portion of the packet and the third preamble portion of the packet from one frequency block.

10. The method of claim 9, wherein the frequency block size is at least one of 160 MHz and 80 MHz.

11. The method of claim 1, wherein a wireless device that supports a maximum bandwidth larger than the frequency block size decodes the second preamble portion of the packet and the third preamble portion of the packet from more than one frequency block.

12. The method of claim 1, wherein the third preamble portion of the packet signals RA information for Orthogonal Frequency-Division Multiple Access (OFDMA) transmission.

13. The method of claim 12, wherein the third preamble portion of the packet in one frequency block signals RA information for the frequency blocks that are allocated to at least one wireless device parked on at least one frequency block.

14. The method of claim 1, wherein a wireless device that receives the packet and that is parked on each frequency block determines its resource unit (RU) allocation information and RU allocation information of an entire bandwidth by decoding the third preamble portion from one frequency block.

15. The method of claim 1, wherein when a wireless device that receives the packet supports a wider bandwidth than one frequency block, the wireless device:
    decodes total bandwidth information to determine a number of valid frequency blocks in the packet;
    extracts channel puncturing information (CPI); and
    decodes each frequency block of the third preamble portion according to the extracted CPI.

16. The method of claim 1, wherein the user specific information field includes frequency RA bits, which indicate the RA of each frequency block, and Nss bits, wherein the frequency RA bits use at least one of 8 bits and 9 bits, and wherein the Nss bits use at least one of 6 bits, 7 bits, and 8 bits.

17. A wireless device configured to communicate within a bandwidth that includes first and second frequency blocks, wherein the wireless device includes a first access point configured to operate in the first frequency block and a second access point configured to operate in the second frequency block, and wherein each of the first and second frequency blocks includes first, second, third, and fourth channels, the wireless device comprising:
    a processor configured to:
    encode, for the first access point and for the second access point, first bits in a first preamble portion of a packet, wherein the first bits are defined on a per-channel basis and that are repeated across the first, second, third, and fourth channels of each of the first and second frequency blocks of the bandwidth;
    encode, for the first access point and for the second access point, second bits in a second preamble portion of the packet, wherein the second preamble portion of the packet is a Universal Signal (U-SIG) portion of the packet, and the second bits are defined on the per-channel basis and the second bits are repeated across the first, second, third, and fourth channels of at least one of the first and second frequency blocks of the bandwidth;
    encode, for the first access point, third bits in a third preamble portion of the packet, wherein the third preamble portion is an Extremely High Throughput Signal (EHT-SIG) portion of the packet, the third preamble portion for the first access point includes a common information field, a user specific information field, and a padding field, the third bits are defined on a two-channel basis, the third bits include resource allocation (RA) bits from the first frequency block, and the third bits are repeated in the common information field and in the user specific information field across the first, second, third, and fourth channels of the first frequency block of the bandwidth;
    encode, for the second access point, fourth bits in the third preamble portion of the packet, wherein the third preamble portion for the second access point includes the common information field and the user specific information field, but does not include the padding field, wherein the fourth bits are defined on the two-channel basis, the fourth bits include RA bits from the second frequency block, the fourth bits are repeated in the common information field and in the user specific information field across the first, second, third, and fourth channels of the second frequency block of the bandwidth, and the fourth bits are different from the third bits; and
    transmit the packet in the first and second frequency blocks.

* * * * *